US012278709B2

(12) United States Patent
Shaffer

(10) Patent No.: US 12,278,709 B2
(45) Date of Patent: *Apr. 15, 2025

(54) METHODS AND SYSTEMS FOR CONNECTING PHYSICAL OBJECTS TO DIGITAL COMMUNICATIONS

(71) Applicant: Fabzing Pty Ltd, Main Beach (AU)

(72) Inventor: Frank Shaffer, Main Beach (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,374

(22) Filed: Dec. 15, 2023

(65) Prior Publication Data

US 2024/0137233 A1 Apr. 25, 2024
US 2024/0235863 A9 Jul. 11, 2024

Related U.S. Application Data

(63) Continuation of application No. 17/210,503, filed on Mar. 24, 2021, now Pat. No. 11,881,956, which is a continuation of application No. 16/698,389, filed on Nov. 27, 2019, now abandoned, which is a continuation of application No. 16/133,687, filed on Sep. 17, 2018, now abandoned, which is a continuation of application No. 15/608,847, filed on
(Continued)

(30) Foreign Application Priority Data

Mar. 28, 2013 (AU) ................... 2013901094

(51) Int. Cl.
*H04L 12/08* (2006.01)
*H04L 9/40* (2022.01)
*H04W 12/06* (2021.01)
*G06Q 30/0241* (2023.01)

(52) U.S. Cl.
CPC ............... *H04L 12/08* (2013.01); *H04L 9/40* (2022.05); *H04L 63/083* (2013.01); *H04L 63/102* (2013.01); *H04W 12/06* (2013.01); *G06Q 30/0241* (2013.01)

(58) Field of Classification Search
CPC ..... G06F 21/10; H04L 63/102; H04L 63/083; H04L 9/40; H04W 12/06; H04W 12/08; G06Q 30/0241
See application file for complete search history.

(56) References Cited

U.S. PATENT DOCUMENTS 8,261,972 B2  9/2012  Ziegler
9,038,887 B1  5/2015  O'Hanlon
(Continued)

OTHER PUBLICATIONS

Geel, Matthias, Daniel Huguenin, and Moira C. Norrie. "PresiShare: opportunistic sharing and presentation of content using public displays and QR codes." Proceedings of the 2nd ACM International Symposium on Pervasive Displays. 2013, pp. 103-108. (Year: 2013).*

(Continued)

*Primary Examiner* — Kari L Schmidt
(74) *Attorney, Agent, or Firm* — Rahman LLC

(57) ABSTRACT

An interactive sports apparel that includes a scannable code forming part of the apparel, and a server configured to simultaneously deliver static media content and streaming media content to content placeholders residing on a scanner that scans the code on the apparel. The static and streaming media each have content based on proximity of the scanner to the apparel, and a user profile associated with the scanner.

17 Claims, 12 Drawing Sheets

Related U.S. Application Data

May 30, 2017, now abandoned, which is a continuation of application No. 14/780,719, filed as application No. PCT/IB2014/060243 on Mar. 28, 2014, now abandoned.

(56) References Cited

U.S. PATENT DOCUMENTS

| | | |
|---|---|---|
| 9,547,917 B2 * | 1/2017 | Zamer ............... G06Q 30/0609 |
| 2002/0133703 A1 | 9/2002 | Morgan |
| 2004/0229569 A1 | 11/2004 | Franz |
| 2004/0262391 A1 | 12/2004 | Harris |
| 2007/0187266 A1 | 8/2007 | Porter |
| 2008/0093460 A1 | 4/2008 | Frantz et al. |
| 2008/0200153 A1 | 8/2008 | Fitzpatrick et al. |
| 2008/0249867 A1 | 10/2008 | Angell |
| 2009/0144447 A1 | 6/2009 | Wittig et al. |
| 2011/0119192 A1 | 5/2011 | Facemire |
| 2012/0044049 A1 | 2/2012 | Vig |
| 2012/0044050 A1 | 2/2012 | Vig |
| 2012/0085829 A1 | 4/2012 | Ziegler |
| 2012/0204307 A1 | 8/2012 | De Mattei |
| 2012/0206647 A1 | 8/2012 | Allsbrook |
| 2012/0223131 A1 | 9/2012 | Lim et al. |
| 2012/0268243 A1 | 10/2012 | Kappeler |
| 2012/0280783 A1 | 11/2012 | Gerhardt |
| 2012/0291647 A1 | 11/2012 | Green |
| 2013/0073375 A1 * | 3/2013 | Abhyanker ............... H04B 5/72 705/14.39 |
| 2013/0102248 A1 | 4/2013 | Jay et al. |
| 2013/0113928 A1 | 5/2013 | Feldman |
| 2013/0117078 A1 | 5/2013 | Weik, III |
| 2013/0132292 A1 | 5/2013 | Lamb et al. |
| 2013/0173383 A1 * | 7/2013 | Sharma ............... G06Q 30/0251 705/14.47 |
| 2013/0214898 A1 | 8/2013 | Pineau |
| 2013/0214901 A1 | 8/2013 | Pineau |
| 2013/0214902 A1 | 8/2013 | Pineau |
| 2013/0246182 A1 | 9/2013 | Bradley |
| 2014/0036097 A1 | 2/2014 | Sexton |
| 2014/0073300 A1 | 3/2014 | Leeder |
| 2014/0114965 A1 | 4/2014 | Balduzzi et al. |
| 2014/0180827 A1 | 6/2014 | Wong |
| 2014/0266626 A1 | 9/2014 | Moulin et al. |
| 2014/0266669 A1 | 9/2014 | Fadell |
| 2014/0281855 A1 | 9/2014 | Bhatnagar |
| 2015/0073879 A1 | 3/2015 | Acosta-Cazaubon |
| 2015/0154624 A1 | 6/2015 | Torabi |
| 2015/0234564 A1 | 8/2015 | Snibbe |
| 2016/0044122 A1 | 2/2016 | Sandholm et al. |
| 2016/0072820 A1 | 3/2016 | Shaffer |
| 2016/0323107 A1 | 11/2016 | Bhogal et al. |
| 2017/0075924 A1 | 3/2017 | Rogers |
| 2019/0037932 A1 | 2/2019 | Martin |
| 2020/0294293 A1 | 9/2020 | Boenig, II |
| 2021/0192505 A1 * | 6/2021 | Xu ............... G06Q 20/102 |
| 2021/0211831 A1 | 7/2021 | Gan |

OTHER PUBLICATIONS

Alt, Florian, et al. "Interaction techniques for creating and exchanging content with public displays." Proceedings of the SIGCHI Conference on Human Factors in Computing Systems. 2013, pp. 1709-1718. (Year: 2013).*

Seeburger, Jan. "No cure for curiosity: linking physical and digital urban layers." Proceedings of the 7th Nordic Conference on Human-Computer Interaction: making sense through design. 2012, pp. 247-256. (Year: 2012).*

Australian Patent Office, International Search Report for Application No. PCT/IB2014/060243, Mail Date Jun. 18, 2014.

Kieseberg, Peter, et al. "QR code security." Proceedings of the 8th International Conference on Advances in Mobile Computing and Multimedia. 2010, pp. 430-435. (Year: 2010).

T. Olsson and M. Salo, "Online user survey on current mobile augmented reality applications," 2011 10th IEEE International Symposium on Mixed and Augmented Reality, Basel, Switzerland, 2011, pp. 75-84. (Year: 2011).

* cited by examiner

METHODS AND SYSTEMS FOR CONNECTING PHYSICAL OBJECTS TO DIGITAL COMMUNICATIONS

RELATED APPLICATIONS

This application is a continuation of U.S. patent application Ser. No. 17/210,503, filed Mar. 24, 2021; which is a continuation of U.S. patent application Ser. No. 16/698,389, filed Nov. 27, 2019; which is a continuation of U.S. patent application Ser. No. 16/133,687, filed on Jun. 17, 2018 titled "Interactive Sports Apparel"; which is a continuation of U.S. patent application Ser. No. 15/608,847, filed on May 30, 2017 titled "Methods and Systems for Connecting Physical Objects to Digital Communications"; which is a continuation of U.S. patent application Ser. No. 14/780,719, filed on Sep. 28, 2015 titled "Methods and Systems for Connecting Physical Objects to Digital Communications"; which claims priority from Patent Cooperation Treaty Application No.: PCT/162014/060243, filed Mar. 28, 2014, titled "Methods and Systems for Connecting Physical Objects to Digital Communications"; which claims the benefit of Australian Patent Application No. 2013901094 filed Mar. 28, 2013, the entire contents of each being incorporated herein by reference.

TECHNICAL FIELD

The present invention relates to articles, systems and processes for enabling a connection between physical objects and digital sources.

BACKGROUND OF THE INVENTION

On-line communications are in widespread and almost constant use within modern society. The use of various social media platforms, both for broadcast and party specific messaging, has become a commonplace aspect of social and business interactions. Mobile communications platforms, and the widespread adoption of tablet computing, smartphones, and similar technologies have made the predictions of the convergence of communications and computing technology a daily reality.

Some groups have sought to further integrate the digital on-line environment into everyday activities and resources. For example, various parties have proposed clothing which is pre-wired to connect various devices and provide power. Domestic appliances, such as washing machines and microwave ovens, have been modified to include internet interfaces, screens and the like.

From the perspective of social media, groups exist to promote and share information about physical places, objects and products. Individuals are able to create their own groups and permit like minded others to join. Some such groups are operated or at least moderated by the respective brand owner. However, while the communications and the group are about a product, they are not actually connected to the product.

Considerable discussion has occurred about the internet of things, which can be defined as the interaction of uniquely identifiable objects and their virtual representations in an Internet-like structure. Whilst this concept has been explored by various parties, no consistent structure has emerged to facilitate interaction between physical objects and virtual content.

It is an object of the present invention to provide a convenient interface from a physical object to a corresponding on line presence or communication.

SUMMARY OF THE INVENTION

In a broad form, the present invention provides a unique code, for example a QR code, on a physical product. The code is conveniently readable, for example by a smartphone or tablet, and connects the reader to a specific network address. A dynamically variable content is provided at the network address. The content may be provided by the product vendor or manufacturer, by the purchaser, by other parties, or a combination thereof.

According to one aspect, the present invention provides a system adapted to provide a connection from a physical object to a network communication, including a physical item with an associated code, a portable computing device adapted to read the code, and being further adapted to connect to a network location, and a server associated with the network location, wherein the code, when read by the computing device, defines a link to a network location, to which location the computing device is adapted to connect; the server including a communication defined for the code, so that the communication is provided to the computing device by the server.

According to another aspect, the present invention provides a method to provide a connection from a physical object to a network communication, including: providing a physical item with an associated code, and reading the code with a user device, wherein when the code is read, connecting the user device to a defined network location associated with the code, that network location defining a server including a communication defined for the code, so that the communication is provided to the user device by the server.

According to another aspect, the present invention provides a method, in a system including at least one physical object with an associated code, at least one portable computing device adapted to read the code and adapted to connect to a network location, and a server associated with the network location, the method including at least the steps of:

(a) At a server, receiving a request from a portable device, the request being generated by said code;
(b) determining whether the device is a member of one or more predefined groups;
(c) In response to the determination, providing a communication and/or access to material, wherein the content of the communication and/or access to material provided is conditional upon said determination.

It can therefore be appreciated that implementations of the present invention allow for a simple and direct interface from the product to associated content. The content is not fixed, and may allow for specific expressions or creations by the purchaser to be linked to the product, for example an item of clothing. This could be a link to a social media entry, or to more ephemeral content, such as images or video relevant to a specific event. Equally, the code may link to instructional material, promotions, act as an identifier, or perform a wide range of potential functions. Because the code can operate as a unique identifier, and because the linkage is not to a fixed webpage but rather to variable, dynamic content, the range of possible uses, applications and interactions with other on line facilities are is very wide.

BRIEF DESCRIPTION OF THE DRAWINGS

Illustrative implementations of the present invention will not be described with reference to the accompanying figures, in which.

DETAILED DESCRIPTION OF THE INVENTION

Figure 1:
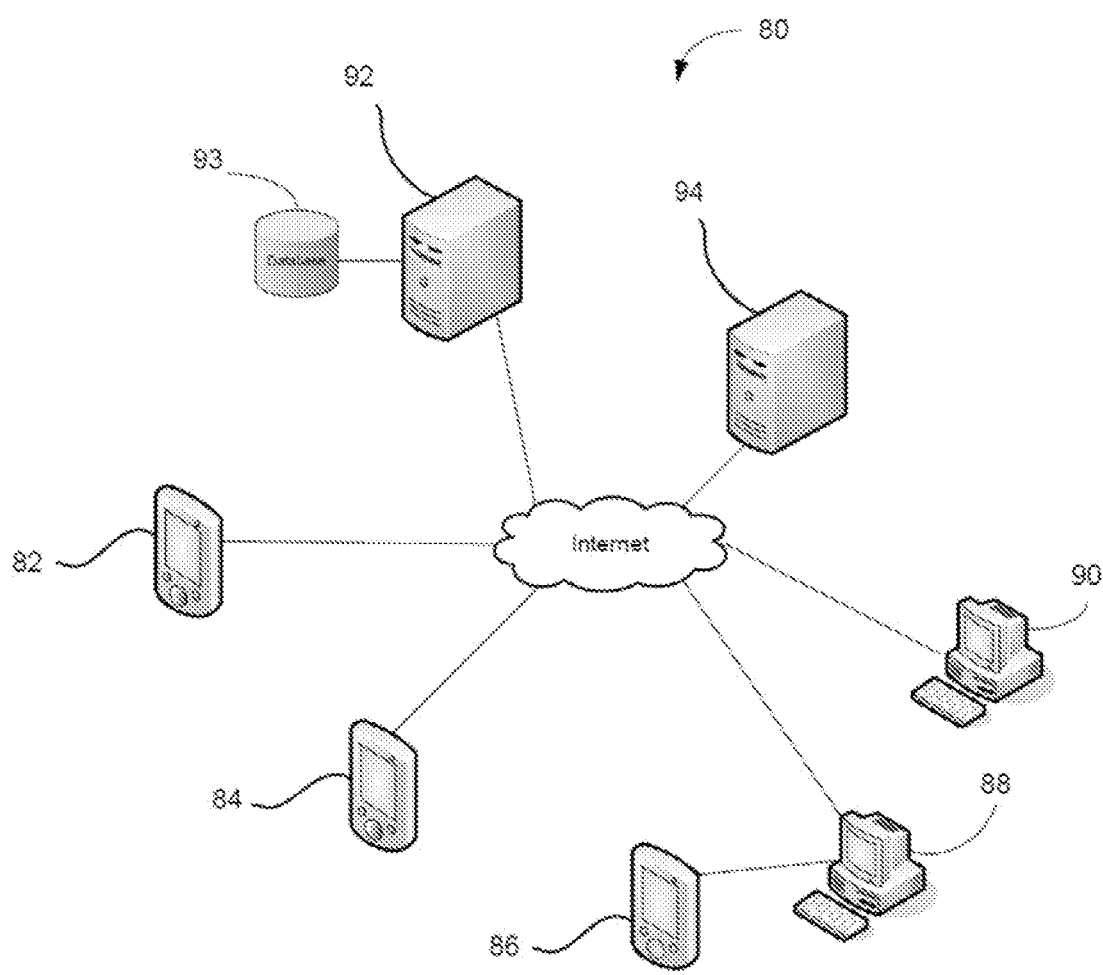
FIG. 1 is a conceptual overview of one system to implement the present invention.

The present invention will be described mainly with reference to several specific implementations, and in relation to particular applications to products. It will be understood that the present invention is an enabling technology, adapted for implementation on many products, and that the specific type of product may influence the types of content and uses for the present invention. Further, the implementation at the content, social media and network side may be variable and adapted to the requirements and norms of that facility. The present invention is intended to encompass all such implementations.

The code to be applied or form part of the product could be an additional feature, or in some cases may already be present. In one implementation, the code is a visual component, such as a 2 dimensional barcode, for example a QR code, or any other visual encoding of sufficient complexity to produce a unique code. Any suitable form of code, capable of carrying sufficient data to produce the required URL or other address. Any kind of visual cryptographic technique could, in principle, be used, for example microdots. The code may be visible in other than visible light, for example in infrared or any suitable part of the electromagnetic spectrum. However, the code could be provided by an embedded RFID device, magnetically readable region, smartcard or similar type contact or contactless chip, near field RF identifier, or any other suitable hardware to deliver or display a code. It could in principle be acoustic. Any way in which the code can be produced, and read, is encompassed within this terminology.

The term 'product' is intended to encompass any kind of physical product, for example clothing, designer goods, tools, electronics, cars and sporting goods. It could also encompass fixed locations, for example an item attached to a building, as well as movable objects. The only limitation is that ability to physically carry, incorporate or display the required coding. The advantages of the present invention are more applicable to durable rather than consumable goods, however, the present invention could be applied to disposable and consumable goods.

The term 'network' is intended in its broadest sense. It includes public and private networks, illustratively those applying TCP/IP protocols such as the internet, but not limited to such networks. They may be local area networks (LANs), wide area networks (WANs). The physical implementation of such networks may be fixed, wireless, optical, satellite, mobile or any other suitable form.

The present invention may be conveniently implemented using a server based virtual facility, such as the facility operated by the applicant as FabZing. Details of the implementation of this system are provided in the applicant's patent application Nos WO 20112041827 (U.S. 61/272,545) and U.S. provisional application No. 61/746,774 by J Frank Shaffer. These disclosures are hereby incorporated by reference. A suitable implementation of a server based, user controlled multimedia messaging system is the FabZing system, which is available at www.fabzing.com and is commercially operated by the present assignee. Of course, any other suitable system may be used to implement the invention.

FIG. 1 provides an overview of the arrangement which is contemplated. Server 92 provides the functional processing, including connection to stored information, account details, and the like required for the system to operate.

The network 80 includes one or more client processing systems and one or more server processing systems. In this example, the client processing systems include smartphone devices 82, 84, 86 and personal computers (PCs) 88, 90. The server processing systems include network servers 92 and 94. The client and server processing systems 82, 84, 88, 90 and 94 are connected via the internet 96 and the smartphone 86 is connected to the PC 88.

The transfer of information and/or data over the network can be achieved using wired communications means or wireless communications means. The server processing systems 92 and 94 can facilitate the transfer of data between the network and one or more databases, such as database 93.

It will be appreciated that embodiments of the invention may be realised over different networks, such as a MAN (metropolitan area network), WAN (wide area network) or LAN (local area network). Also, embodiments need not take place over a network, and the method steps could occur entirely on a client or server processing system.

It will be understood that the server used according to the present invention may be of conventional type. It may be a real server, or a virtual server distributed over several actual machines. The user interface via the network can be using any device capable on the selected network, and which is able to read the code used according to the implementation of the invention. In the case of a visual code such as a QR code, this could be a conventional smartphone (e.g. iOS or Android based) with a camera, an app which can read and interpret a QR code, and internet access via a cellular network or wireless network such as WiFi. Those skilled in the art will appreciate that such devices are widely available, and so the network and user hardware aspects will not be further described.

Functionally, the applicant's service (which may conveniently be based on the internet, or 'in the cloud') allows a user to create rich media content combining audio, text, graphics, images and video. The electronic documents created using the applicant's software, known as FABZings, incorporate multiple components to enable the provision of rich, personalised, user defined content.

Figure 2:
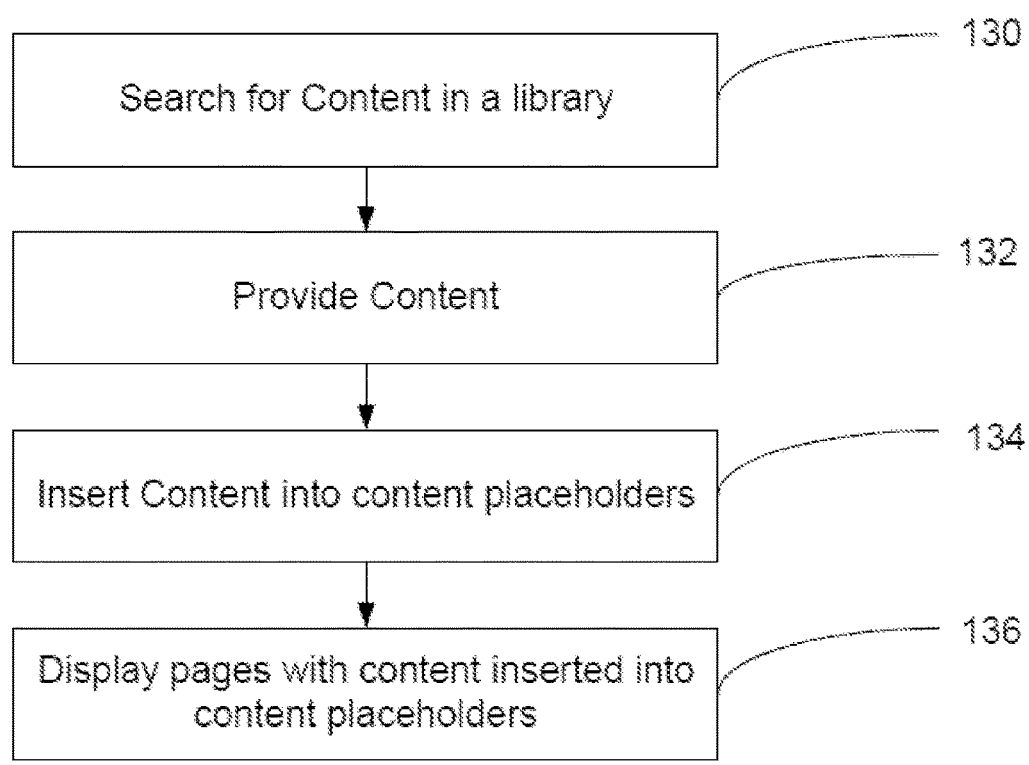
FIG. 2 is a flow chart illustrating connecting content in an implement the present invention.

FIG. 2 shows a method for providing an electronic document (such as a fabzing) to a user according to an embodiment of the invention. This may be provided using a convenient web interface, for example from a smartphone. At step 130, the software enables the user to search for content in a library of content. The software then provides content for insertion into the electronic document at step 132, for example by downloading content and storing it in the memory of the smartphone 82. At step 134, the software inserts content into one or more content placeholders in response to a request by the user. For example, the user may use a touch screen (or other input device 108) to select content to be inserted. One or more pages of the electronic document are then displayed on the display screen of the reader at step 136 with the content inserted in the one or more content placeholders. The document, is then able to be stored on the remote server which is providing the media content.

One example of the application of the present invention is to fashion items, for example clothing, handbags, and shoes. A QR code may be incorporated into the item. In one form, the code may be a clear and obvious statement. It could be included only in a conspicuous way, in a non obvious place, for example inside a handbag, or in a clothing label. Alternatively, the QR code (or some other readable visual code) could be concealed within or incorporated into the pattern or design of the article.

The QR code is preferably unique to the article, and a permanent part of the article. It is preferred that the code remain part of the item, and not be (for example) merely on a swing tag or the like.

When the user reads the code, for example using a smartphone, the reader is directed to a FabZing server location. The FabZing server will deal differently with each code, and can deal with the user differently and dynamically. Hence, many different QR codes for individual items from the same manufacturer may be dealt with by the same server.

For example, on first contact, there may be a request to register the item as associated with the purchaser. In this case, if the item is stolen or not genuine, the server will not progress the session, and may for example alert authorities, or at least advise the purchaser of this.

From the perspective of the purchaser, it allows them to verify that an item is genuine. A false or copied QR code will not, for example, link to the registration function with the vendor, as the vendor will either not have defined that specific unique code on the server (as it is false), or it will already be registered to someone else (because it is stolen or a copy QR code). From the perspective of the party who placed the code—the brand owner, retailer or manufacturer (hereinafter collectively 'vendor')—it creates an opportunity to develop a direct relationship with the purchaser. For example, the registration process may be as simple as a connection to a social media account of the purchaser. The brand owner then has a way to, for example, make special offers, offer free upgrades, invite purchasers to events, or promote related products.

It would be possible to include a requirement for a link, for example from the retailer verifying purchase, prior to activation of the QR code and association with a given purchaser.

Apart from the advantages to the vendor or the product owner, there are substantial advantages to implementing the present invention in this way for the purchaser. For example, they can verify that an item is genuine. In a preferred implementation, once they are 'connected' to the code associated with the item, they are able to add their own content to be triggered by the QR code. For example, the purchaser may be attending a party with a theme, and pre-program video and audio content triggered on user's smartphones if they read her code. The content, moreover, may vary with who has read the code, so that friends (on Facebook.®. for example) see one message, and strangers another.

Hence, this application of the present invention may be termed fashion coding, as it allows for a stream of multimedia content to be generated from an article of clothing, being content defined and controlled by the purchaser. This turns static point of sale clothing purchases into an ongoing real time communications platform. For non-branded items, for example, the code would simply allow for registration and the connection of the user's own content.

Figure 11:
FIG. 11 is a screen shot of a log in screen for a fashion coding app.

FIG. 11 is a screenshot of an illustrative sign in screen. The screen includes buttons allowing the user to sign in, create a new fabZing, or save a newly created FabZing.

Figure 12:
FIG. 12 is a screen shot similar to FIG. 11 showing social media log ins.

As can be seen in FIG. 12, sign in can be completed using one of several social media or other connections, as illustrated. It will be appreciated that a social media connected sign in is commonplace in web enabled software, and will not be described further.

Figure 14:
FIG. 14 a conceptual screen shot of an app to access fashion coding according to an implementation of the present invention.

FIG. 14 illustrated a home screen from fashion coding app. The user is able to activate a code from an item, sign in, select from defined categories (eg handbags, evening wear, shoes), or visit the library of connected items and fabzings.

Figure 15:
FIG. 15 is a conceptual screen shot of the app of FIG. 14, illustrating playback.

FIG. 15 illustrates the playback process, when a code is read and the user wishes to view the associated content. The user can choose from a variety of playback settings, including shuffle, linear and range in this example. Shuffle provides a randomized order, similar to a shuffle selection on a digital music player. Linear plays the content in a particular order. Range allows for the user to set the range over which the playback is possible, for example only when scanned, or within some radius (as determined using the GPS or similar functionality of the user's device).

The items of clothing become, in addition to their fashion function, a multimedia broadcasting channel from which the vendors can inform, entertain, market, and provide customer service in real-time at precisely the moments when their clientele are wearing and interacting with their products.

The code could be used to link to more utilitarian files, such as presentations, written documents, or the like. This could, again, be confined to specific parties who read the code, with an entirely different message being provided to others (or no message at all). This is achieved by the scanning app querying the database for relationship information such as purchasing patterns, followers, or friendship data between the user and creator. An implementation of this is explained in more detail below.

Particularly in relation to clothing and fashion items, a virtual wardrobe can be created, based upon the codes of the items which the purchaser has connected to their social media account. This could be an app associated with the social media system, or the smartphone. The codes are provided by the vendors, and so can have their dimensions, characteristics, fabrics, colors, etc readily accessible if required—all the way to washing and care instructions. The purchaser can then consult their virtual wardrobe to decide what to wear, or submit it to a clothing selection app to allow it to suggest what and in what combination to wear to what event.

A related application is to use the same infrastructure to provide a code associated with other items. For example, a code on a power tool could link initially to a registration process, which also collects information for warranty purposes, and then offers multimedia content to assist in training, safe operation, etc. The user in turn could associate content of their choice, for example video and plans of a project they propose to undertake. Similarly to the 'virtual wardrobe', the coding could support a 'virtual toolbox' which would allow all instructional and warranty information to be automatically collected in one place. Details of specifications, operating requirements, etc are then collated in a single place, together with user selected content such as plans, projects, etc.

Another related application of the present invention is to items such as collectable objects, artworks, limited editions, or memorabilia. A unique code is attached to the respective item, which when read, provides details of the object. For example, on a collectible, the code may link to details such as the provenance of the particular item (as the code is unique), physical details, date of production, size of series, publically available links about the item, etc.

However, in accordance with the present invention, it may also connect to user generated material. There may be a community of collectors. A forum and related links to other collectors and retailers may be provided. The code can be linked into the collection catalogue of the purchaser, similar to the virtual wardrobe discussed above.

This provides a mechanism for a prospective purchaser to check the ownership and details of an object prior to purchase, using a mechanism which is relatively independent from the vendor. This provides additional security against theft, fraud and counterfeits. In this case, an independent entity, for example an auction house or museum, could manage the content accessed via the code, to further enhance its authentication properties.

A further application of the present invention relates to the hire of vehicles or other products. In this case, a unique code (such as a QR code) is associated permanently with the vehicle, for example. In a hire car, reading this code in a Smartphone or the like would allow the user to access the user manual, relevant maps, tourist information, etc. By combining with the GPS location information from the phone, the information could be relevant to the specific location. The information could include links to store, restaurants and attractions in the area.

The server accessed by the code could further permit the user to use audio, for example tour guides, or an appropriate set of music tracks, stored using the system.

A similar application of the present invention is to taxis. The unique code would in this case identify the vehicle, which will assist in safety for the passenger, as they are then located in a particular taxi. The associated app in this case could, at the option of the passenger, keep as record of location, speed, etc for the trip. Similar tourist and attraction information to the hire car example could also be made available. Information about charges, how to book a return taxi, and similar practical information, could be also available, optionally in a selected language for the customer.

In another application, the code could be associated with a new motor vehicle. The code may be used to access and provide manuals, service information, and allow the driver to upload experiences, comments, etc relevant to his experience of the car. He may define in advance, for example, an audio play list for the journey linked to the code. It creates a way for the vehicle vendor to create a community of owners, so as to enhance the experience of owning a particular vehicle, and to allow a marketing channel direct to the owner.

The server can be arranged so that if anyone but the owner reads the code, that a promotional presentation relating to the vehicle is played. Thus, the code in this case (or in any other suitable application) can operate as a marketing tool even after the vehicle is long in the market. It also provides an easy way to provide ongoing information, for example about the maintenance or operation of the vehicle, to the driver.

A further application of the present invention is to healthcare. In one form, a unique code may be provided on a package of pharmaceuticals. If the patient scans the code, detailed instructions can be provided, not just for the patient but for any health care professional who inspects it, for example in the possession of an unconscious patient. Scanning the code as associated with a particular patient in a hospital could form a further component of a system to ensure that the correct medication is given to the correct patient, for example by reading the code as part of a controlled medication dispensing process for nurses—if the wrong package is scanned, an alert is generated. A detailed note of time of administration could also be inherently collected.

Further, the code could provide a link back to the manufacturer for the patient. Updated information, adverse effects, questions about interactions, or even a request for a repeat (if the code is linked to the prescription) could be easily generated from a smartphone reading the code.

It will be appreciated that the equipment, physical locations, and even staff could have codes, with appropriate links. For example, the equipment may link to instructions, troubleshooting, consumable orders, or simply to register that it has been used in conjunction with a particular professional and a particular patient.

It will be understood that a complex media signal, with a video coupled with written directions and warnings, and a detailed diagram, accessible on a smartphone or similar device via the code, could be greatly beneficial in many situations. It has the virtue that the information can be updated, augmented and corrected without the need to communicate changes to the users individually—if indeed it is possible to identify them.

A further application of the present invention relates to the use of a code on, for example, a child's uniform or other garment. In one respect, this allows for a contact message or details to be made available to a party who finds a lost item of clothing. For child safety reasons, it may not be desired that the child's details as such are attached to the garment. However, upon the finder reading the code, either parent contact details, or a direct messaging screen, could be provided to the party who located the garment. This allows for the present labels to be replaced with a more secure system which does not reveal the name of the child to a stranger.

This may also be useful if a child becomes lost at a public event of shopping mall. The code will enable the parent to be contacted directly, either by a phone or other contact details provided when the code is read.

Another application of the present invention relates to an ability to create a personalised experience and relationship between a celebrity and a party who purchases a licensed item, which could be any suitable object such as a garment, game, sporting equipment, or other item. The item included an integral code, which allows a connection to a dynamic website provided by a particular celebrity, team or other individual.

Once the purchaser (or gift recipient) receives the item, they are able to read the code, which takes them first to a registration page. This may require, for example, some proof of purchase in addition to merely reading the code. Alternatively, the proof of purchase may be communicated via the merchant.

The purchaser then includes some personalisation details, for example preferred name, birthday, favourite songs (for a performer), or other details as appropriate. The registered user then has access (by scanning the code) to special content only available to purchasers so connected. For example, a current season jersey for a baseball player may give access to the team media, as well as for that player.

In one possible implementation, the player may upload personal commentary, video of training sessions, details of appearances and specials events, in a highly targeted way. The garment code may be active for only one season, or for several, perhaps with reducing levels of access. It may also operate as a 'ticket' to access controlled areas, reserved for fans who have bought team specific merchandise. Loyalty and discount systems may also interface to the code.

In turn, the fans could upload (potentially moderated by a suitable person) their own content—personal messages from fans, questions, video shot from the stands, and so forth. This then creates a potential community of interest for those who have bought the current jersey for that player.

Further, upgrades or special experiences could be purchased, linked to the specific, coded jersey and the customised information therein. For example, a data merge with customized textual inputs could very simply create a personalized cinematic experience for vast numbers of devoted fans. For example, a video clip is created by the New York Yankees with Derek Jeter running toward the camera, then sliding into third base and popping up and saying, "Yo dude happy birthday, I got here as quick as I could." Then the text slides in wishing young Tommy a very happy 7.sup.th birthday from Derek Jeter and the Yankees.

It will be apparent that similar arrangements could be used for other celebrities, with appropriate modifications.

Individuals, creators, or brands can control playback of network content in a variety of methodologies or settings such as in a particular order or shuffle. The originator can alter settings to put in what they wish, or have it respond differently to different parties or both. There could be mood based content auto generated based on one's recent purchasing patterns of music or film or internet viewing patterns along with personalized updates and edits based on geographic settings or biographic data such as a personalized message on your birthday when wearing a branded polo shirt.

In another related implementation feature, the code could effectively link to a broadcast of the game, restricted to those who have a registered item. The game can effectively be played back from the jersey. In suitable sports, a camera associated with each player, for example from a helmet, belt, or baseball hat, could provide customised feed which is only accessible via the code to registered owners. In this way, the item owner can view the game from the specific perspective and viewpoint of their chosen player, again triggered by the code. Such perspectives may be available at a game for all players on one or both teams, so that the supporters can choose to arrange or edit the coverage to see what they want to see, or to have multiple video and audio streams to watch simultaneously as the action moves.

In this way, each purchaser could in turn provide (should they choose) their own edited highlights for upload to the supporter community. In one form, this video feed may be only available on the code linked network or website and for manipulation there, and not able to be more generally downloaded (eg to social media). This would both enhance the value of membership of the community (by buying the requisite item), but also drive traffic to the site, for promotion, advertising and similar advantages to the site operator and the respective celebrity.

Figure 16:
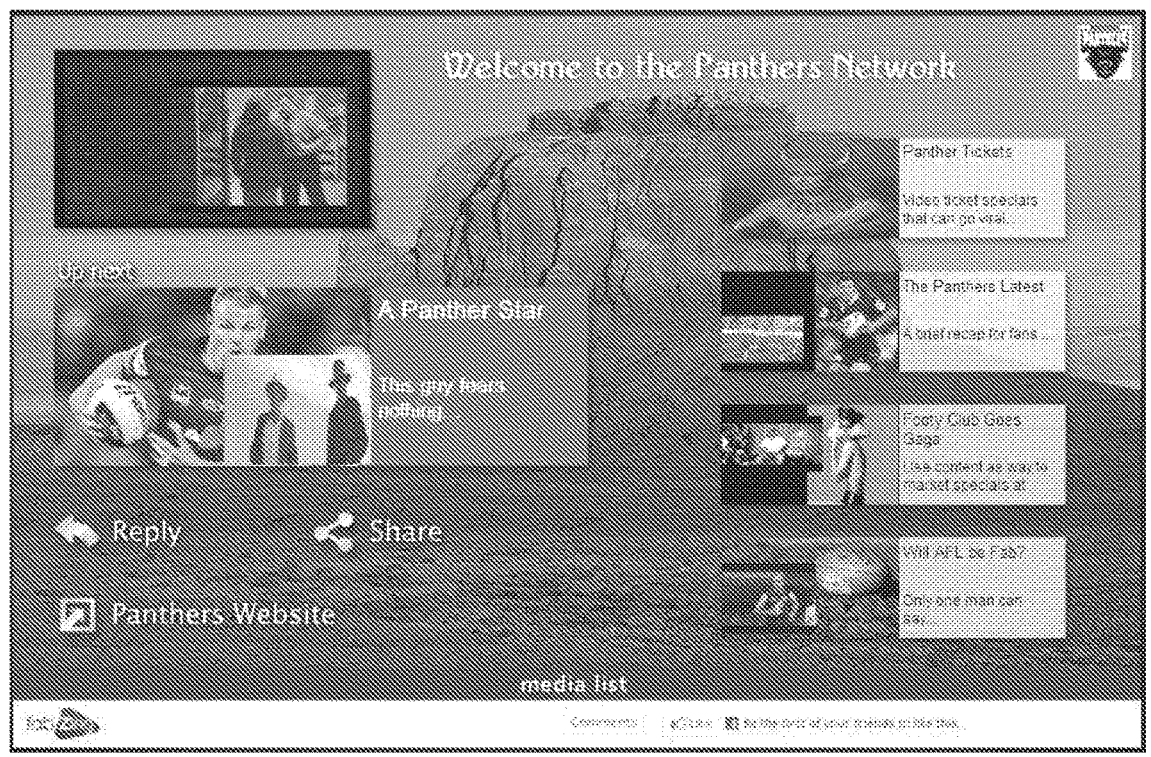
FIG. 16 is conceptual screenshot of a sporting club related content network.

FIG. 16 illustrates an example sporting club content delivery, accessible only by purchasers of designated merchandise, who then register their code and obtain corresponding site access privileges. This may display news, special content (for example, video from training sessions), provide a chance to buy tickets, including special seating only available to this community, and a variety of related special content. It will be apparent that also from a promotional and special opportunity perspective, this community will represent the most ardent fans, and so those most likely to pay for further special events or privileges.

It is possible to further enhance some implementations of the present invention by overlaying location based parameters. This can be using the GPS or similar facility on the smartphone. In this way, specific messages, content, and invitations could be sent out. For example, in a celebrity related code and item, a message that the celebrity will be making an appearance in 2 hours at a location may only be sent to those users who are proximate to the location.

In another aspect, the content itself may vary. In one example, video of an evening dress worn by a celebrity to an event may be updated to only play within a short distance, for example 300 m, of the celebrity to help draw a crowd to the function.

Location based parameters tied to your smartphone or a fixed site can be implemented on the broadcast range of a shirt, doorbell, restaurant menu, car and the like. In this manner someone could replay a 'dinner special' saved on their phone from a prior visit to see what was on offer for the current evening.

In another implementation, the unique code may be used to provide a game to patrons at a bar, casino or other venue. The code may be worn by the attendant, for example a drinks waitress. The code provides a link to a game. This may vary in sophistication from a simple lottery or one spin random game, to a complex game which is played for some time on the patron's smartphone. In one form, the back end may be associated with an implementation of server based gaming, in which local terminals merely display screen information and commands/selections, and the game is operated and controlled at the server from a regulatory and practical perspective. In another implementation, the game may be similar to a conventional on line game. This aspect of the present invention is concerned not with the particulars of game play, but with the mechanism by which the user is enable to access those features via their own smartphone, tablet or the like.

It will be appreciated that the particular nature of a platform which runs on a particular user's device facilitates customisation at various levels. For example, any voluntary or other constraints on gambling can be readily implemented, as the game is running on an identified user's device. Different games, different return to player options, different special features, and so forth can be provided because, in contrast to a conventional slot machine, the user is identified and can be connected with a user profile, loyalty information, and indeed credit information if required.

The game may require a wager to placed, which could be collected by the waitress, for example. Payment could equally be collected via a player card, or other payment mechanism. The code could be concealed, for example in the payment wallet often used for cash and credit cards, so that it is only available when the account is paid. Alternatively, the game could be always available to patrons.

In one form, the game could shuffle between different games or content, either controllably or randomly. In principle, any kind of electronic gambling game could be provided by this kind of mechanism—Instead of a slot machine pulling up random fruit icons, personalized cinematic content of short 15-30 second durations over any number of categories such as comedy or a sports highlight could play with a winning or losing payout announcement coming on at the conclusion of the video. In this way customized content and playing options can evolve around the personal habits and tastes of a consumer. In addition, dynamic algorithms could be developed based on prior playing times and habits to prolong or enhance a user's experience. The venue may provide no more than cards or fixed codes attached to tables or walls which link to the gaming options, in a similar manner to that described above. The implementations of the present invention disclosed enable those skilled in the art to access a selected online address, at which conventional on line games could be provided, in a simple implementation of this aspect.

It will be understood that an alternative form of this implementation is either free, or requires a drink purchase (or similar) to participate. A loyalty type game, with prizes of relatively low value such as free food or drinks, small cash prizes, or the like could be offered to visitors to the venue as a bonus for their custom.

Figure 3:
FIG. 3 is a view of a door including a QR code.

A further application of the present invention may be to provide a code of the type discussed at a site, as effectively a virtual doorbell. FIG. 3 illustrates a notional door with a QR code associated. This could be at a front door as illustrated, in an office, outside an apartment building, or even at a remote gate or other location. The code can be applied using a sticker.

Figure 6:
FIG. 6 is screenshot of a system to create and connect content.

Reading the code with a smartphone or the like will link to a page selected by the occupier owner, or responsible person (for convenience, the owner). FIG. 6 illustrates an example interface allowing the message to be created. Various tabs allow the selection of video, image, message, and animations, which are placed in a template as shown. These components are essentially windows and can be moved around and re-sized as required. The interface also allows the user to search for content on the internet or select from existing material to create the multimedia message.

Figure 4:
FIG. 4 is conceptual screen shot of an interface to control the doorbell responses.
Figure 5:
FIG. 5 is a conceptual screenshot of a possible message.

Once the messages are created, the owner can select the material and content to be displayed from time to time, using a screen similar to FIG. 4. This is called a 'doorbell library'—showing a range of pre-created messages which the owner can choose to use. For example, the default response may be to call or message the owner's phone, or perhaps a number of phones, associated with the occupants, and advise the visitor that 'Mr X has been alerted, and will be here shortly'. Alternatively, the message may be selected to be something else, for example, as shown in FIG. 5. In this case, the owner is indicating that they are asleep and do not wish to be disturbed.

The response could be specific for particular users, so that different messages are provided to friends (defined in an address book, or simply via social media) than to strangers. It may provide instructions as to who to contact if the house is unattended. The system can also readily keep a log of all those who have read the code, and potentially trigger alarms, cameras, or the like of the person meets certain criteria.

In the event that the owners are away, the code could connect to a friend or neighbour's phone, who can then determine the response. A messaging function could be readily built into the system to facilitate this.

A feature of the particular implementation used is that user behavior can be readily monitored and logged. This operates firstly at the server level, to provide information on who has viewed a specific multimedia presentation (as linked by the code), their location, link actions, as well as how much of each segment of the multimedia presentation was watched. The ability to measure precisely how much of a multimedia presentation was viewed allow close analysis of the activities of those who read the code and follow the link.

Stickers or other simple carriers of a QR code with associated content can also be provided, for example to provide membership of a group or authorisation for access in some activity. For example, a promotional sticker for a band may simply provide access to a website about the band for most users. For the registered owner exclusive musical content, such as interviews or music downloads, may be made available. They may also facilitate, for example, user generated content to be added, and made available to only selected groups.

Hence, in one context, a sticker may simply give access to the public website of a popular band for most people. For selected friends, user generated content, for example a humorous video or invitation, can be made available.

Similar functions could be triggered from and kind of promotional item, for example tickets, programs, etc associated with a performance. Special offers, for example recordings of that performance at a discounted price, could be available only to those who attend and link through the associated code.

Figure 7:
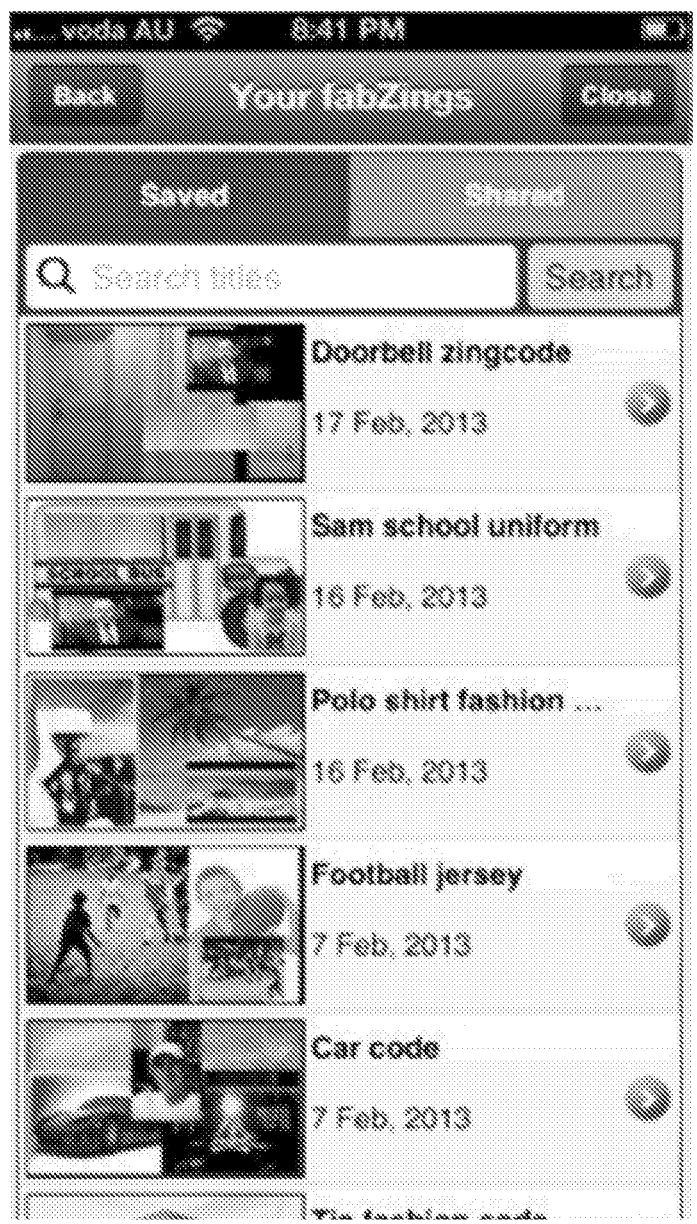
FIG. 7 is a screen shot of one implementation of a control app for various coded items that are connected to a user.

FIG. 7 is a screen shot of a control app which can be readily provided on a smartphone or the like. As the owner acquires or is associated with various items with an associated code, they are listed in the app, for the owner to review and access. The app could sort the items by categories, so that tools, clothing, etc are grouped together.

Each item has an entry, and clicking on the arrow will provide more details and a management screen, in a typical smartphone interface. This also allows for the user to associate their chosen content with a particular item, in whatever way they see fit.

It will be appreciated that the dynamic nature of the link addressed by the code allows for many different aspects of conventional internet and network facilities to be used in conjunction with the code in implementations of the present invention. For example, a password and/or username may be required to access information beyond a log in type screen. This is not essential, but is an option which can be readily provided. Readers of the code who are identified as friends on a social media platform may receive different content, or those who do not meet this criteria may receive more generic content or no content at all.

It will be appreciated that the present invention can be applied to a wide range of purposes, and that the mode of operation, subject matter, and additional features provided will necessarily change the implementation details. For example, any other suitable messaging system could be used to be linked via the coding, provided it provides the necessary functionality.

Figure 8:
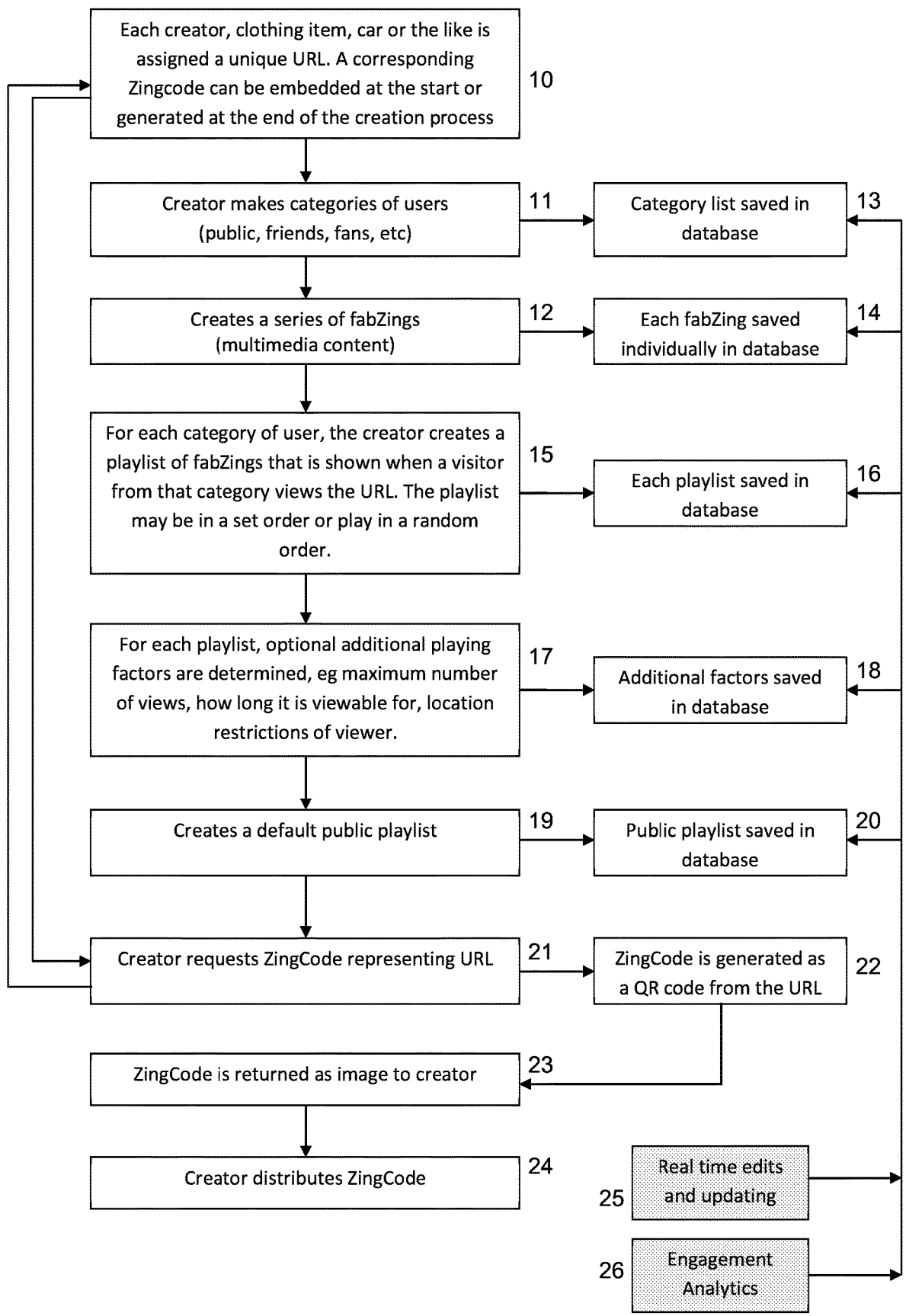
FIG. 8 is a flow chart of an example creation process for creating content to be associated with a code and an item.
Figure 13:
FIG. 13 is a conceptual screen shot of an app to allow creation of zingcodes according to an implementation of the present invention.

FIG. 13 illustrates a home screen for a smartphone app for accessing and creating zingcodes—i.e. visual codes to be associated with an item, location or the like. It allows the user to sign in, look at fabzings in various categories (which they may choose to associate with a code), FIG. 8 illustrates an example creation process for creating content to be associated with a code and an item. It will be appreciated that in a preferred implementation, all these steps are assisted by a web based workflow tool to guide the creator through the process.

Each creator and each item are first assigned a unique QR code 10. A zingcode can be associated at the same time, or this can be generated at the end of the creation process.

The creator then makes categories of users 11—for example, friends, family, groups, fans or the like, similar to what is well known and widely implemented on social media sites. This list is saved to a database 13.

The creators then make a series of fabzings 12, as defined previously. Each is saved individually to the database 14. These are then formed into a playlist of one or more for each category 15, and each playlist is similarly saved to the database. A fabzing from the appropriate playlist is shown when a user from that category scans the QR code. For each playlist, optional additional factors may be added 15. For example, this may include a maximum number of views, location, how long the item is available, or other parameters as discussed previously. These factors are also saved to the database 16.

A default public playlist 19 is also created, for those not in any of the groups, and saved to the database.

The creator then requests the allocation of a zingcode 21 representing the url for which he has been creating. The zingcode is generated as a conventionally coded QR code 22, and returned as an image to the creator 23. The creator can then distribute the QR code as appropriate 24, for any of the applications discussed above.

In parallel, the system allows for real time edits and updates to be made 25, and for engagement analytics to be generated, using the conventional components of the Fab Zing system.

Figure 9:
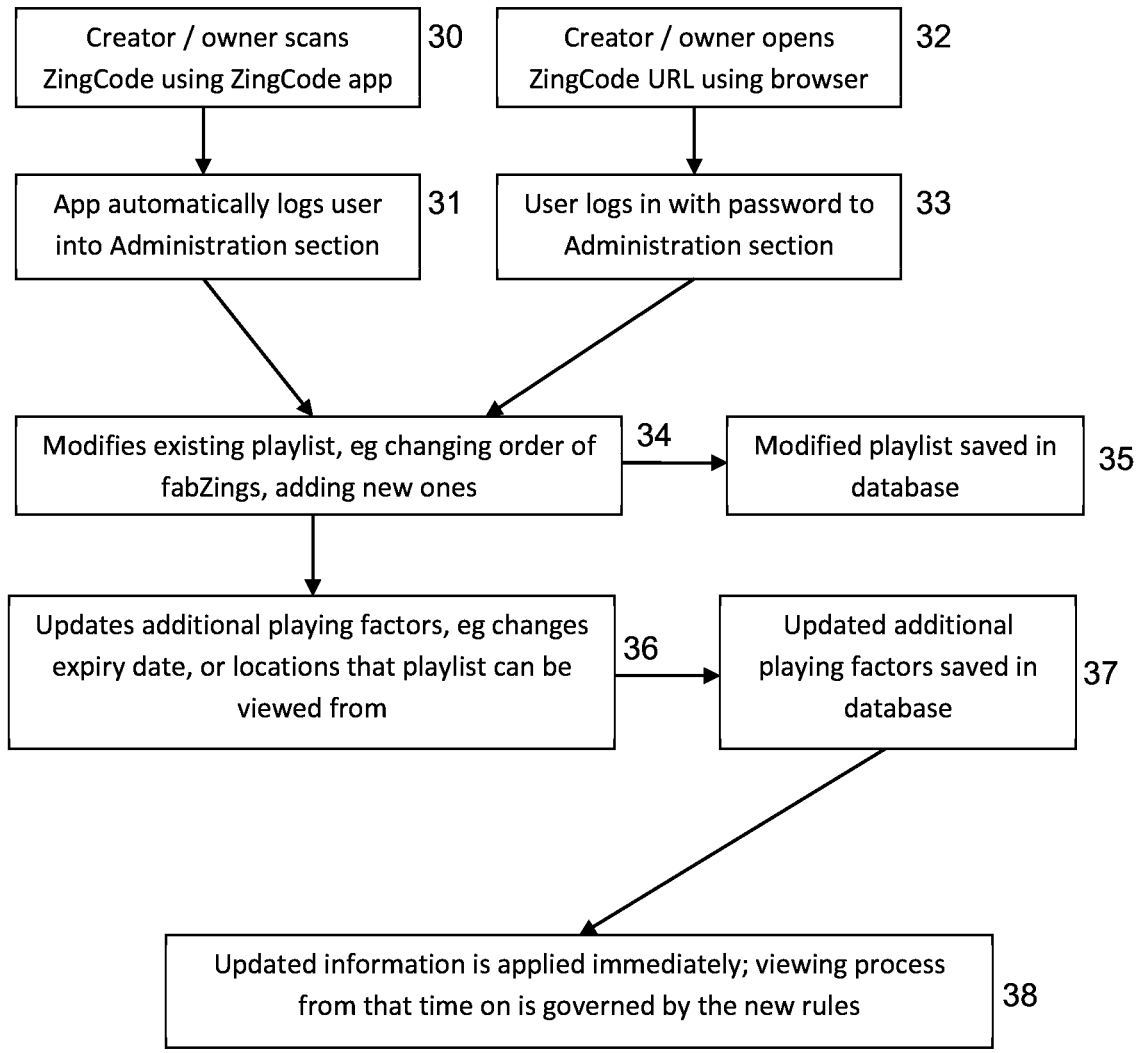
FIG. 9 is a flow chart of a an update process corresponding to FIG. 8.

The creator is enabled to update the content. FIG. 9 illustrates this process. To commence, the creator may either scan the QR code 30, using the zingcode app 31, which takes the user directly into the administration section. Alternatively, the creator may log in via the URL using a browser 32, and log in their allocated password to the administration section 33.

This facility permits the owner to make a variety of modifications, including modifying the existing playlist, add new FabZings 34, update playing factors and groups, and in general edit the media behind the QR code 35. The changes are then saved to the database 35, 37. The updated content is then immediately available, and the new rules and content will be displayed thereafter when the code is read 38.

Figure 10:
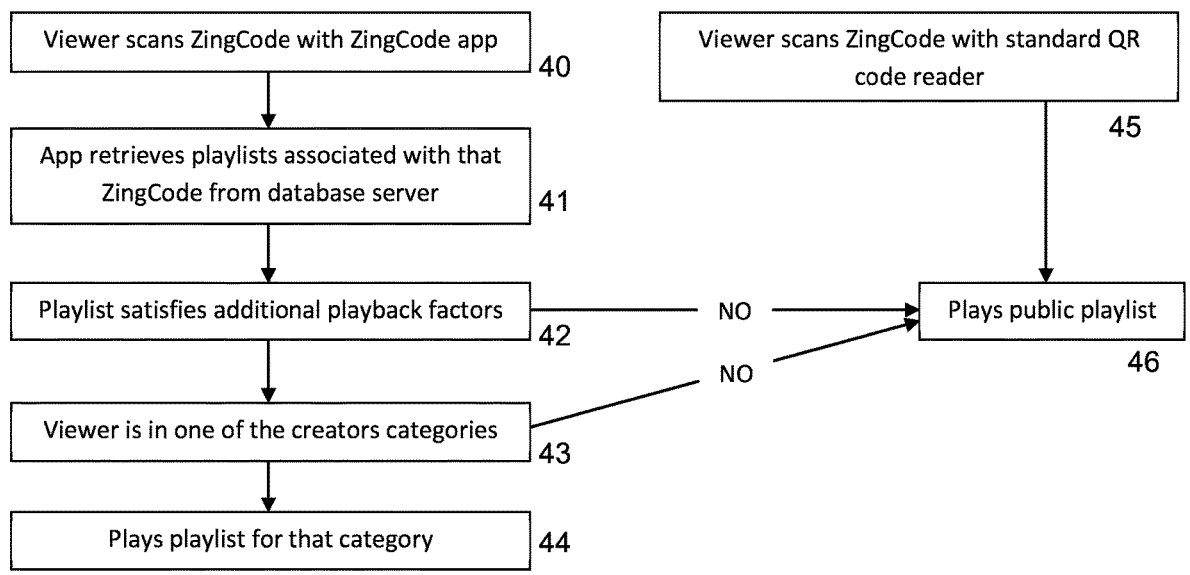
FIG. 10 is a flow chart illustrating a viewing process corresponding to FIG. 8.

FIG. 10 illustrates the process which operates when the code is to be viewed. The viewer scans the code 40, illustratively with their smartphone, but potentially with any fixed or mobile device that can read the code. The smartphone needs to have loaded, in this implementation, the corresponding ZingCode App. It will be appreciated that implementations without this requirement are possible, however, a mechanism to control and enforce the playlist restrictions and control is required.

In an important distinction relative to conventional arrangements, in which a code simply links to a URL, the material returned depends upon the status (and potentially other factors) of the user reading the code. A general member of the public may receive an entirely different media presentation than a friend. The app, interacting with the remote server hosting the database, retrieves the playlist associated with the ZingCode 41. The app, in cooperation with the remote server, determines which if any additional playback factors are fulfilled, 42 and the order of their priority, in order to select the playlist to be provided. The app also checks is the player is in one of the special categories defined by the code owner. The playlist for that category is then played. The default playlist, if no other criteria are fulfilled, is the public playlist 46. Only at that stage is the corresponding content downloaded (or made available for viewing by) the remote device.

Similarly, if the code is read using a conventional QR reader, then the public playlist is provided.

If no categories are satisfied, the public playlist (which may be empty) is returned. In some cases, if multiple factors are made out, a choice could be provided to the viewer.

This process is used both by the manufacturer of the products, although this may be done on a much broader scale, as well as by an individual adding content to a unique QR code supplied by a manufacturer.

What is claimed is:

1. A system adapted to provide a connection from a physical object to a network location, wherein the physical object includes an associated readable code, the system comprising:
a server associated with the network location, wherein the code, when read by at least one portable computing device adapted to read the code and connect to the network location, defines a link to the network location,
wherein a plurality of viewer groups are predefined for the code, with the at least one portable computing device being associated with at least one of the plurality of viewer groups, and the server is adapted to selectively provide one of a plurality of different communications defined for the code to the at least one portable computing device, at least some of the plurality of different communications containing information specific to the physical object, and at least some of the plurality of communications being associated with at least some of the plurality of viewer groups,
wherein a selected communication of the plurality of different communications associated with a selected viewer group of the plurality of viewer groups is transmitted to the at least one portable computing device, if the selected portable computing device is associated with the selected viewer group,
wherein additional material is added to the server, so as to personalize one or more of the plurality of different communications specific to the physical object, wherein the one or more of the plurality of different communications augmented by the additional material is associated with certain of the plurality of viewer groups, and
wherein on receipt of the code read by the at least one portable computing device, the server is configured to:
determine an occupier status as to whether an occupier associated with the physical object is contactable; and
send the selected communication to the at least one portable computing device depending upon the occupier status.

2. The system of claim 1, wherein the physical object is an entryway of a dwelling.

3. The system of claim 1, wherein the additional material comprises a doorbell library including a selection of customized messages presentable to a visitor associated with the at least one portable computing device depending upon the occupier status of the occupier, and the server is configured to:

forward the selected customized message indicative of a customized visitor message to the visitor in response to receiving the code scanned by the at least one portable computing device, after ascertaining the occupier status of the occupier; and send a second message to the occupier to alert the occupier of the presence of the visitor at the physical object indicative of a dwelling.

4. The system of claim 3, wherein the server is a distributed network.

5. The system of claim 1, wherein the selected communication from the plurality of different communications transmitted to the at least one portable computing device is further dependent upon a determination whether one or more additional parameters being satisfied, wherein the one or more additional parameters is selected from a group comprising one or more of a physical location of the selected portable computing device, a proximity of the selected portable computing device to a defined physical location, a time, a date, a previous access or a previous registration of the selected portable computing device, a user, a username, a password, and an authentication.

6. The system of claim 1, wherein the code is further associated with a fixed physical location, and reading the code further allows access to a means to communicate with a party or to receive a new communication relating to the fixed physical location.

7. The system of claim 1, wherein reading the code further allows access to one or more: games either randomly presented or preselected, specific content, specific products, specific physical locations, and delivery of user directed content.

8. The system of claim 1, wherein the selected communication includes a combination of a static image, a video, a textual message, and an animation configured from a template for creating a multiple format multimedia message.

9. The system of claim 1, wherein the server is configured to keep a log of visitors who have scanned the code using the at least one portable computing device.

10. The system of claim 1, wherein the server is configured to activate an alarm if a visitor associated with the at least one portable computing device meets predetermined criteria.

11. The system of claim 1, wherein the server is configured to activate a camera if a visitor associated with the at least one portable computing device meets predetermined criteria.

12. A method for providing a connection from at least one physical object to a network location, wherein the at least one physical object includes an associated readable code, in a system comprising a server associated with the network location, wherein a plurality of viewer groups are predefined for the code, with at least one portable computing device being associated with at least one of the plurality of viewer groups, and the server is adapted to selectively provide one of a plurality of different communications defined for the code to the at least one portable computing device, at least some of the communications of the plurality of different communications containing information specific to the at least one portable physical object, at least some of the plurality of communications being associated with at least some of the plurality of viewer groups, and wherein an additional material is added to the server by an occupier, so as to personalize one or more of the communications of the plurality of different communications specific to the at least one physical object, wherein the one or more of the plurality of different communications augmented by the additional material is associated with certain of the plurality of predefined viewer groups; the method including at least the steps of:

receiving, by the server, the code positioned in proximity to the at least one physical object from the at least one portable computing device;

determining, by the server, an occupier status as to whether the occupier is contactable; and sending, by the server, at least one of the plurality of communications to the at least one portable device depending upon the occupier status.

13. The method of claim 12, wherein one or more additional parameters are defined which determine which communication of the plurality of different communications is to be provided, the one or more additional parameters being selected from a group comprising a physical location of the selected portable computing device, a proximity of the selected portable computing device to a defined physical location, a time, a date, a previous access of the selected portable computing device, a registration of the selected portable computing device, a registration of a user, a username, a password, and an authentication.

14. The method of claim 12, wherein the at least one physical object is an entryway of a dwelling.

15. The method of claim 12, wherein the additional material comprises a doorbell library including a selection of customized messages presentable to a visitor associated with the at least one portable computing device depending upon the occupier status of the occupier, and the server is configured to:

forward the selected customized message indicative of a customized visitor message to the visitor in response to receiving the code scanned by the at least one portable computing device, after ascertaining the occupier status of the occupier; and send a second message to the occupier to alert the occupier of the presence of the visitor at the physical object indicative of a dwelling.

16. The method of claim 12, wherein the server is configured to activate an alarm if a visitor associated with the at least one portable computing device meets predetermined criteria.

17. The method of claim 12, wherein the server is configured to activate a camera if a visitor associated with the at least one portable computing device meets predetermined criteria.

* * * * *